United States Patent
Hutchinson

(10) Patent No.: US 11,151,564 B2
(45) Date of Patent: Oct. 19, 2021

(54) SECURE AUTHENTICATION AND FINANCIAL ATTRIBUTES SERVICES

(71) Applicant: Shawn Hutchinson, Harpers Ferry, WV (US)

(72) Inventor: Shawn Hutchinson, Harpers Ferry, WV (US)

(*) Notice: Subject to any disclaimer, the term of this patent is extended or adjusted under 35 U.S.C. 154(b) by 0 days.

(21) Appl. No.: 16/481,778

(22) PCT Filed: Jan. 26, 2018

(86) PCT No.: PCT/US2018/015401
§ 371 (c)(1),
(2) Date: Jul. 29, 2019

(87) PCT Pub. No.: WO2018/140700
PCT Pub. Date: Aug. 2, 2018

(65) Prior Publication Data
US 2019/0392447 A1    Dec. 26, 2019

Related U.S. Application Data

(60) Provisional application No. 62/451,520, filed on Jan. 27, 2017.

(51) Int. Cl.
*G06Q 30/02* (2012.01)
*G06Q 20/40* (2012.01)
(Continued)

(52) U.S. Cl.
CPC ..... *G06Q 20/4014* (2013.01); *G06F 21/6245* (2013.01); *G06Q 30/0256* (2013.01); *G06Q 30/0633* (2013.01); *H04L 63/08* (2013.01)

(58) Field of Classification Search
CPC .................................................. G06Q 30/02
See application file for complete search history.

(56) References Cited

U.S. PATENT DOCUMENTS 7,363,253 B2 *  4/2008  Forbis ............... G06Q 10/0875
                                                        705/26.8
8,019,694 B2 *  9/2011  Fell ...................... G06Q 30/02
                                                        705/400
(Continued)

FOREIGN PATENT DOCUMENTS

JP        2011-520196 A  *  7/2011  ............. G06Q 30/00

OTHER PUBLICATIONS

Khalid Yusuf; Maman Abdurahman; Aji Gautama Putrada, Increasing Passive RFID-Based Smart Shopping Cart Performance using Decision Tree (English), 2019 5th International Conference on Computing Engineering and Design (ICCED) (pp. 1-5) Apr. 1, 2019 (Year: 2019).*

(Continued)

*Primary Examiner* — Marilyn G Macasiano
(74) *Attorney, Agent, or Firm* — Leslie Wilson

(57) ABSTRACT

Provided are devices, interfaces, methods, and systems for secure authentication of identity of information including identification data and financial attributes, wherein the secure authentication comprises storing identity information in a protected data repository with a private data record, assigning a reference identifier for a private data record in a protected data repository, receiving a request for authenticating identity information comprising a reference identifier and public identity information, requesting access to private identity information through a private approval interface with said reference identifier, requesting a portion of said private data record from said protected data repository, verifying identity information from said portion of private data record and public identity information, responding with an authentication or multi-valent response.

20 Claims, 5 Drawing Sheets

(51) Int. Cl.
    *G06F 21/62*     (2013.01)
    *G06Q 30/06*     (2012.01)
    *H04L 29/06*     (2006.01)

(56) References Cited

U.S. PATENT DOCUMENTS

| | | | | |
|---|---|---|---|---|
| 10,846,725 | B2 * | 11/2020 | Isaacson | G06Q 20/105 |
| 2002/0091635 | A1 * | 7/2002 | Dilip | G06Q 40/00 |
| | | | | 705/39 |
| 2010/0324972 | A1 * | 12/2010 | Brooke | G06Q 30/0283 |
| | | | | 705/26.3 |
| 2012/0130866 | A1 * | 5/2012 | Cooke | G06Q 30/0643 |
| | | | | 705/27.2 |
| 2018/0189786 | A1 * | 7/2018 | Poole | G06Q 20/00 |

OTHER PUBLICATIONS

Hinarejos, M.M.; Ferre-Gomila, J.;Draper-Gil, G.;Huguet-Rotger, L., Anonymity and Trabsferability for an Electronic Bank Check Scheme (English), 2012 IEEE 11th International Conference on Trust, Security and Privacy in Computing and Communications (pp. 427-435), Jun. 1, 2012 (Year: 2012).*

* cited by examiner

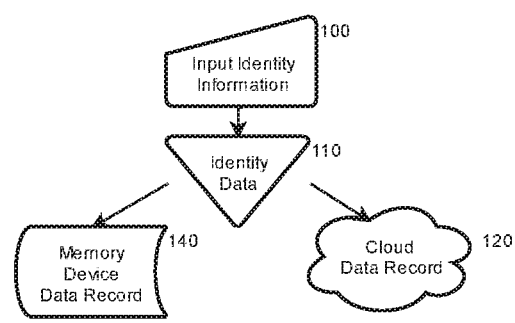
Figure 1
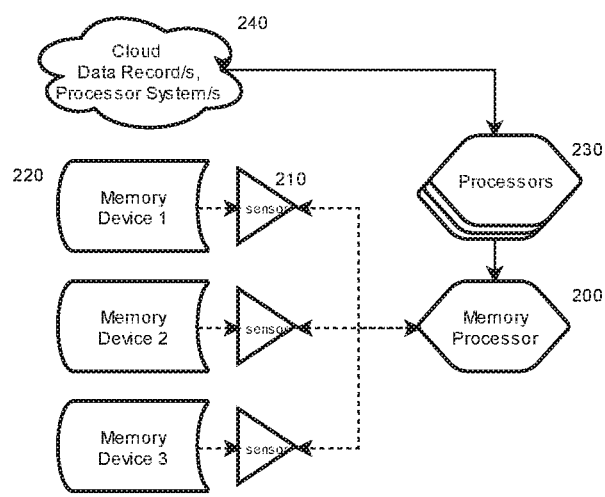
Figure 2

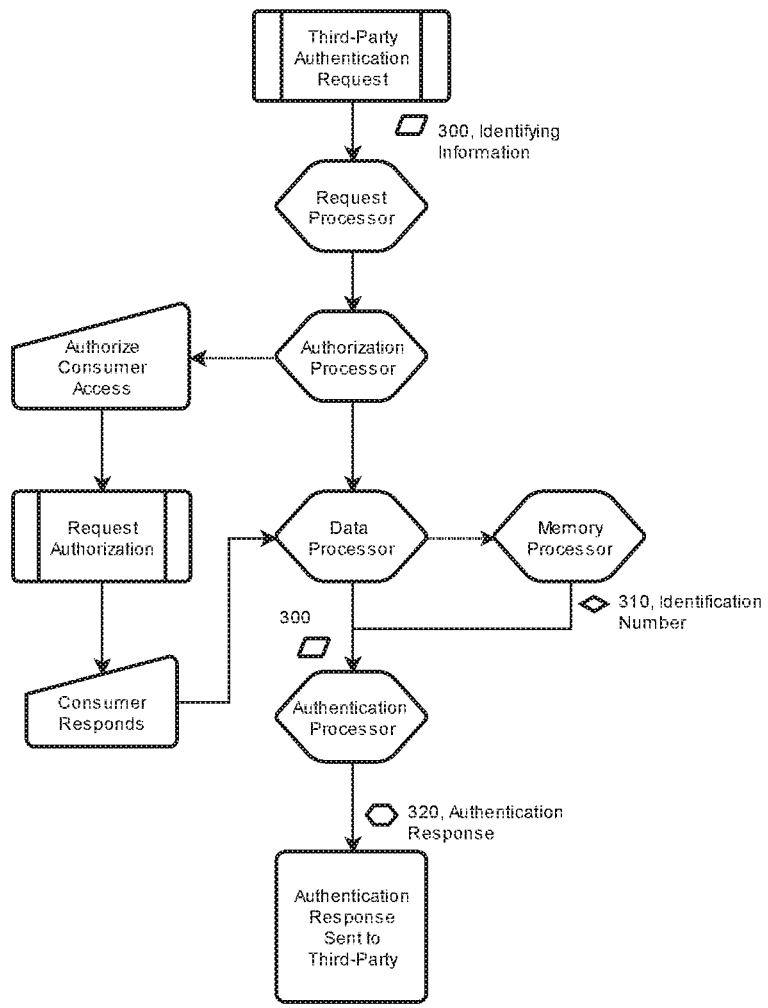
Figure 3

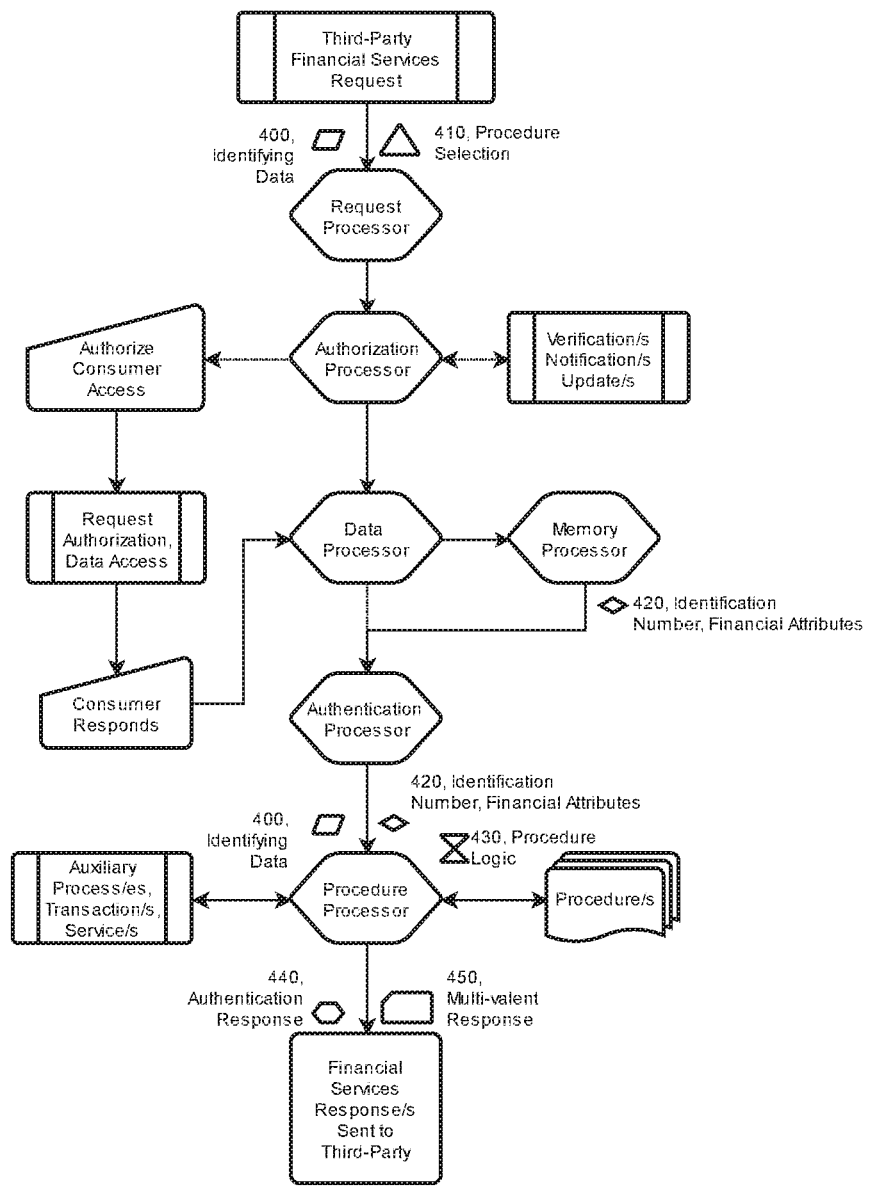
Figure 4

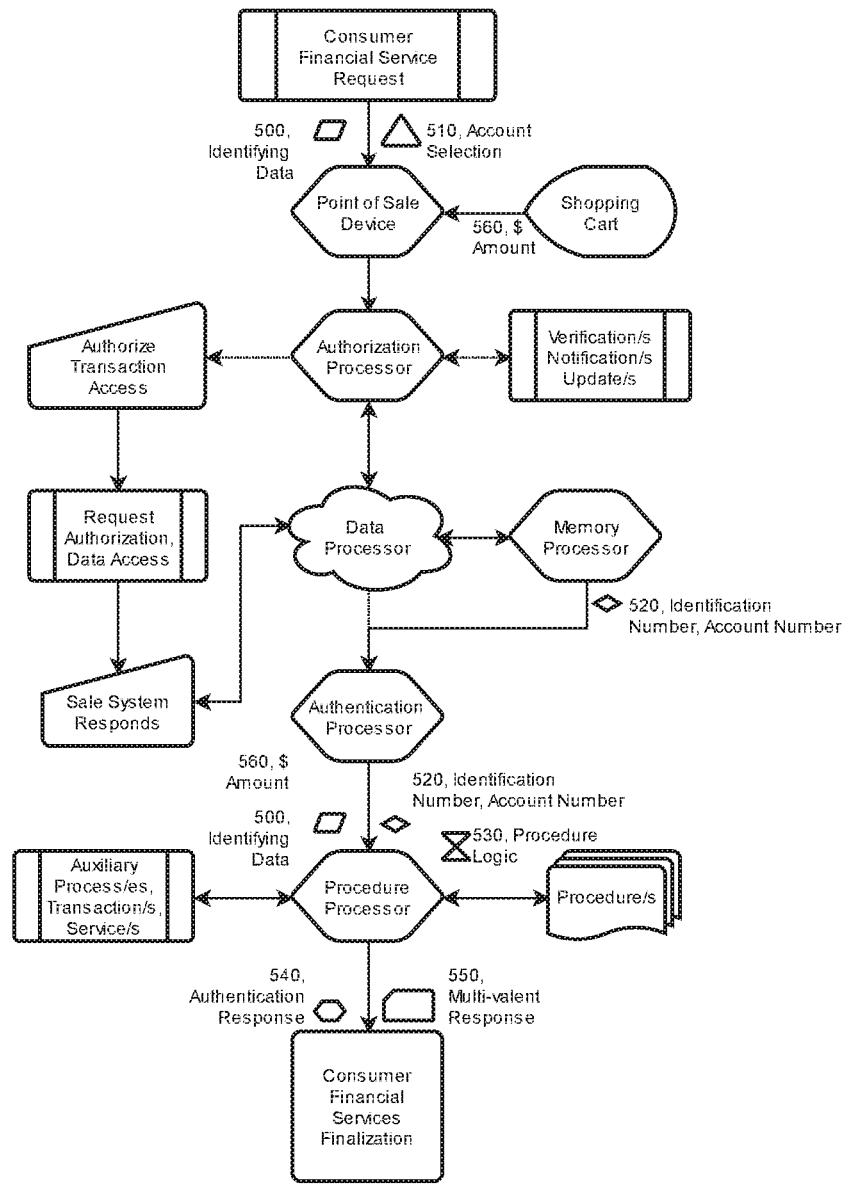
Figure 5

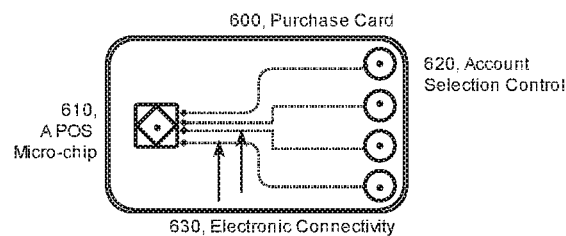
Figure 6
Figure 7A
(Prior Art)
Figure 7B

SECURE AUTHENTICATION AND FINANCIAL ATTRIBUTES SERVICES

BACKGROUND

An essential need exists to protect personal identity data while also making this identity data available to process financial transactions. While a great deal of effort has focused on practices of authentication, encryption, protection, and security, these practices rely on the transmission of data to process financial transactions. Personal identity data is oftentimes transmitted during the process of authentication and financial services in order to process transactions. However, such approaches expose businesses to excessive liability and consumers to possibility of having private identity data compromised. For businesses, reducing costs of protecting private consumer data leads to greater profitability, while for consumers, reducing exposure of private identity data leads to greater security.

Authentication and financial services systems often rely on application to propound information in a manner that is useful for verifying identity and obtaining financial services. Personal identity data is provided by a consumer on a loan, for example, and the information is inputted into a database. The data is checked and processed, and yet consumer records are held within a business database. The identity information often includes private data such as a social security number that may be encrypted or not, and transmitted in other transactions or internal to an organization. Such data, is an essential identifying feature for a consumer, and yet also vulnerable because it is a number that is assigned to a person for the duration of a lifetime. Therefore a practice and service that allows a consumer to obtain improved authentication and financial transactions advantageously protects businesses and consumers.

Additional transactions encompass the transmission of private data that pertains to a consumer that is not otherwise public information. Credit card numbers, as another example, are often held in business systems in order to process transactions on behalf of the customer. A business that records credit card numbers results in costly expenditures to businesses for the security and protection of consumer information. Furthermore, the cost of indemnifying and discovering fraudulent credit activity is an expensive cost to credit card companies. Therefore a practice and service that allows businesses to transact financial services such as credit card transactions without the exposure of credit card numbers advantageously protects credit card companies, businesses that depend on credit, as well as consumers.

SUMMARY

The purpose of Secure Authentication and Financial Attributes Services is to provide authentication and financial services using personal identity data while retaining the privacy of certain identity and financial attributes. These services operate in a manner that separates to varying degrees private identity data and public identity data from authentication and financial services. Private identity data is held separately from financial transactions at various times during the use of such data, in order to restrict the transmission of private data. Businesses may excise the cost and practice of holding private consumer data, as well as the risks of liability and exposure on account of having such data in their possession. Consumers may accordingly have various controls on their private identity data and the use of this data for authentication and financial transactions, as well as affordable assurance that such data is unavailable as a general rule. Providing extensive controls to consumers of identity data and financial attributes provides great confidence for purchase transactions of all levels. Providing configurable controls to businesses of the authentication and financial services provides even greater protection of profits and interests. The practice of secure authentication and financial attributes services encompasses devices, methods, and systems that leverage these controls for the advantages of businesses and consumers. The breadth of financial services encompasses transactions of any monetized format.

One of the essential and yet vulnerable types of private data that any and all consumers require is an identification number. In the United States of America, the Social Security Number is assigned by the government agency for every citizen at birth. This record static identification number is retained by the consumer during the course of one's lifetime. However, this number is also used repeatedly in order to obtain and to qualify for financial services such as applications, credits, loans, and taxes, and so forth. The number, however, were it obtained by a malicious third party, could be a factor in performing an actions that is often referred to as "identity theft". Therefore, one of the most preferred uses of the practice is to resolve the steps required for the authentication of a consumer identity that are used for financial transactions without the transmission of a Social Security Number.

For the purpose of an illustrative example, the practice retains private data information for a consumer within a denetworked system and responds to a request for a loan with a yes, or no, decision. The latitude and span of the practice, however, provides a flexible and modular system wherein any and all financial transactions are processable without the transmission of private data over networked channels. Although examples of the practice are illustrated with the use on a form interface of an identification number in the present invention and Social Security Number as prior art (FIGS. 7A, 7B), the full scope of the identity authentication encompasses any manner of referencing a person or entity.

FIGURES

FIG. 1. Data Input and Memory Devices. A data input device allows a consumer to input identity information into one or more memory storage devices.

FIG. 2. Memory Devices and Data Retrieval. Data is accessed from a memory device with a memory process having connectivity to processors and a cloud.

FIG. 3. Identifying Data and Secure Authentication. A flowchart for secure authentication of identifying data.

FIG. 4. Financial Services Request, Third-Party. A flowchart for secure authentication of identifying data and response to financial attribute service request.

FIG. 5. Financial Services Request, Consumer. A flowchart for a financial service request from a consumer at a Point of Sale.

FIG. 6. Point of Sale Purchase Card. A consumer purchase card having selectable features.

FIG. 7. Financial Services Sample Form. Financial services application form with and without a SSN.

DETAILED DESCRIPTION

A secure authentication of identity commences first with receiving an identification number for a person or entity. An identification number or record is stored in a data memory. An identification number for a customer may be a Social Security Number. An identification number for an entity may be an Employer Identification Number. A data memory may be in the format of a solidstate device, or it may be a device that is on a network such as the internet, an intranet, extranet, deepnet, and/or a cloud. The identification record is held in memory that is accessible to a processor. The processor is able to make at least basic operations such as comparisons and computations. The processor interfaces with the data memory in order to retrieve at least a portion of the identification record such as a number.

For each unique identification number, a record also has stored a reference number that a consumer uses to reference an identity record. The identification number in this example may be a Social Security Number. While a reference number comprises a portion that the consumer may use for applications and forms rather than the Social Security Number. The reference number may comprise a static and/or dynamic portion. The reference number may mask or encrypt the identification number. The data record comprises at least equivalent identifying features of the identity of a person.

The processor receives a reference number for the purposes of authenticating the identity of a consumer. The processor also receives identifying information about the person's identity. The identifying information may comprise information that is public and/or private. The identifying information may accompany the authentication request at the time of receipt, or according to a desired time differential. Public identifying information may include an address, telephone number, or any kind of information that is available on a public record. Private identifying information may include identifying features that are known privately by the consumer, such as biographical details, taxable income, and/or personal information. The identifying information may also include a private verification protocol through a telephone number, text message, finger print, or other unique referencing identifiers or authentication protocols.

The consumer has the ability to control access to the identifying number with the desired methods of providing an accompanying identifying information. The consumer may provide settings for the availability of accessing the identifying number for the purposes of authentication. Settings may include number of accesses, time of access, address of location, entity permissions, rendezvous timing, recurring access, and/or desirable rules that customize the level of security of the identifying number for consumer. The consumer may be notified of a request for authentication through a digital interface, such as through a telephonic prompt, sms text, electronic mail, voice mail, or other alert or notification of a request to access private identity information.

The processor receives public and/or private identifying information from the consumer and/or a third party. The consumer provides the identifying information to the processor and/or data record. The consumer provides the identifying information from an interface that has connectivity through an internet, intranet, extranet, cloud, solid memory, chip, a physical input at a node, or a method of input that is non-electronic. Identifying information may be held in the data record with the identification number and reference number or may be held in another port of memory that is accessible to the processor or that the processor receives data from. The size of such memory may be from a bit or less, a chip card, an identification card, to macromemory devices such as a drive, shared resources, or to networked resourced such as a cloud. Information may be recorded and/or stored in any manner that allows a processor to receive the information or to request the information when queried to authenticate the identity of a consumer. Transmission of data to, from, with, accompanying, and between the processor and memory may be conducted in any desired protocol such as a secure channel, private-key encryption, integrated circuit, as well as non-electronic transmissions.

The processor receives public and/or private identifying information for a consumer from a third party. The third party supplies the information or requests the information on behalf of the consumer. The consumer may provide a consent or an authorization for the authentication of identifying. The consumer may provide a static or dynamic reference code in order to authorize the authentication. The consumer may provide rules or settings in order to control access to the authentication protocol. The authentication may require input from the consumer in order to complete the authentication request. The processor receives or retrieves the components of the authentication request from the consumer and the third party. The processor then performs a process of authenticating the consumer's identity according to the data provided. The processor may be a crypto, secure, private, distributed, quantum, parcel, mapping, deconvoluting, or encrypted processor.

The third party may, for example, provide a physical address, telephonic address, name, and Zip code of the consumer. The consumer may be notified that the third party is requesting authentication. The processor retrieves data from one or more memory records with the identifying data, or has data supplied to it. Authentication of the identity is accomplished with data check, verification, deconvolution, or any practice of comparing the validity of and/or matching the value of data. The processor responds to a request to authenticate identity with binary response such as yes/no as well as a condition, status, request, bit, code, number, and/or provision of data. Responses may furthermore elicit additional requests and transmission of data.

The response of the processor to the authentication request provides a method for the system to respond to the authentication of a consumer identity in a multi-valent manner. Multi-valent responses allows the authentication to respond with confirmation of an identity, as well as more complex responses. Examples of the multi-valent responses that are complex encompass the likes of provisional authentication, authentication with indication, authentication with request, and/or a negatived authentication with one or more error codes. Error codes could indicate the kind of mismatch of data, missing data, suspicious data, and proprietary indicia. Furthermore, authentication responses, or their negatives, may additional accompany a payment increment, fee, toll, and/or token.

A third party may request various levels of authentication of information that may comprise a fee structure according to the level of detail. A third party could require: a surface match with regards to a social security reference that matches with address, a history match with regards the purchases and debts, a more extensive background check that cross-checks personal accounts with biographic details, or an exhaustive probe that exposits the results of a thorough examination of all of a consumer's personal and financial records. As such, the data record for a consumer may moreover comprise data for and/or access to public and private records that comprise financial attributes such as credit report, tax transcripts, court records, medical records, and/or any type of record that refers to, depends upon, references, or is linked to the identity of a person and/or entity. A third-party may also cause to have data transmitted to, with, preceding, or following an authentication request.

The practice of and service to the authentication of identity may be provided through computer or digital systems. Interfaces to the processor for a consumer may be an internet website, wireless connectivity, automated programming interface (API), automated cleaminghouse, batch processes, secure sockets, direct coding, and/or software calls. The consumer may input data through a human-memory interface that is assisted through a node, terminal, website, and/or computer interface. The interface may include physical components that are transported or shipped to and from the consumer.

A physical interface may include a solidstate memory device that may be accessible only one time, a limited number of times, or unlimited number of times in order to record personal data of the consumer. Personal data may include social security numbers, account numbers, biometric data, and/or biographical information. A physical-digital interface may be provide to the consumer in order to input this data in an alphanumeric, digital, audio, electromagnetic, and/or frequentive input. The interface may be sent to and received from the consumer. The data from an interface may be recorded onto, into, through, and/or coded in a data memory record. The data record is accessible directly or indirectly to the processor. The memory device may comprise a processor that interfaces with the authentication request processor, or may be accessed through another processor that interprets between processors.

A data memory device may be inaccessible to a signal or caused to be inaccessible to an electronic signal. The processor that accesses a data memory device may be inaccessible to an electronic signal or caused to be inaccessible to an electronic signal. The processor that retrieves data from a data memory device may comprise a probe or sensor that transmits and/or receives a signal in an optical, wavelength, electromagnetic, molecular compound, combinatorial, thermal, and/or structural format. The data device receives and/or transmits a data signal in an optical, wavelength, electromagnetic, molecular compound, combinatorial, thermal, and/or structural format.

The memory device and/or the processor may receive an electronic signal and subsequently be rendered inaccessible to electronic signals. The memory device and/or the processor may receive an electronic signal and subsequently be rendered inaccessible to electronic signals. The memory device may be rendered inaccessible in order to protect the data from electronic reading and/or writing. The memory device may undergo transformation of physical, chemical, structural, crystallographic, electric, thermal, and/or phase states. Data may be stored, written, encoded, and/or incorporated in or with a physical, chemical, structural, crystallographic, electric, electronic, optical, thermal, and/or phase states of matter. The memory device and/or the processor may have been rendered inaccessible to electronic signals and rendered accessible. A device or processor may be rendered accessible or inaccessible through a physical, electromagnetic, interference, and/or thermal device or apparatus such as a shield or scrambler. A device or processor may be rendered accessible or inaccessible through a timing device, sensor, probe, radiation, thermal, and/or chemical sequence or combination of exposures.

The memory device communicates a signal to the processor with one or more of the methods accessible and/or transformational states. The memory device and processor may also communicate in electronic formats through cifer, interpreter, key, quanta, piranha, rubrix, shibboleth, signals, sublimate, tokens, and/or encrypted data. The processor may read, sense, determine, or register that a signal or state of the memory device. The memory device and processor may be programmed with rules regarding the accessibility of the data and/or device. Accessibility, signals, state, and/or rules are implemented in order to protect the integrity and security of the data. A routine or sequence of one or more of these signals, states, and/or rules may be programmed, calculated, determined, and/or handled in order to grant an access accessibility for the processor to retrieve data. Data is communicated in one or more of these methods to and from one or more memory devices and processors.

In order to authenticate the consumer data, a processor retrieves data from the memory device and receives consumer data from the authentication request. One or more processors conduct the operation of authenticating the consumer data. The processor responds with a determinate signal or status of the consumer identity. The processor may also respond in one or more of the confirmation or complex responses as defined above. The processor that retrieves data from the memory device may be a transmission chip or simple query device that responds with data in a format for a processor performing the authentication check. Separating the function of processors into low-level operations and data storage protects the integrity and security of consumer data. Implementing memory devices that respond in non-electronic ways provides degrees of separation that protect and secure data. The practice of performing authentication of consumer data using the memory devices that are accessible in non-electronic ways further protects the integrity and security of consumer data.

One preferred embodiment of the method protecting and securing data is the protection of credit card information during transactions. The data for financial transactions, for example, is moved from customer to business to credit card company to business to business transactions. With the use of the reference number, customers can be provided with new purchase and sales cards that allow the use of remote b2b transactions in order to process credit card purchase. Merchants and sellers would not need to store credit card information in order to process transactions. One or more reference numbers of the customers, in static and/or dynamic format, would allow a purchase card to process at a point of sale system and supply the needed information to approve a transaction without transmitting a credit card number from the point of sale device. A smartphone or electronic device with selectable accounts also may be used at a point of sale device. Rather, with the one or more reference numbers the purchase card provides the data that the point of sale device uses to process a transaction with a system having a processor that processes the transaction with a credit card company on behalf of the customer.

In the embodiment having the one or more reference numbers and a credit card. Processing of a transaction may proceed first with the method of authenticating identity as described above. Processing a transaction may proceed without a response for authenticating identity or with a multi-valent response as described above. In a portion of a data memory device, credit card numbers may be stored. The customer may have provided these numbers through a graphical user interface or a device that allows for inputting of account numbers. The consumer may select accounts for use with a purchase and/or at a point of sale. The consumer may use one card for purchase while drafting from one or more payment debit, credit, money, derivative, resource buffer, future, pool, donation, and/or bank accounts.

The consumer may also provide settings that automate the selection of one or more credit card accounts in order to process one or more transactions. Previous settings on the priority or preferential use of credit card accounts allows customers to preselect cards for specific uses, such as for food, groceries, fuel, utilities, exchanges, marketplaces, and/or bets. Selection of an account may activate the purchase card for use and/or configure a chip or stripe for use at a point of sale device. The purchase card may be a Smart Card that is programmable by the consumer or a third-party for use at a POS. The consumer can trace and track the details regarding third party requests for financial services such as with the time of request and type of financial service conducted. One or more reports or statements may generate or caused to be generated through any one or more contact, inquiry, request, transaction, notification, authorization, purchase, and/or sale. One or more consumers, entities, networks, systems, commissions, agencies, registers, logs, inquiries, officials, bots, persons, and/or transcripts receive/access to track and/or trace the one or more systems and/or practice that implement one or more financial services.

A purchase card may work on and/or with existing merchant accounts, automated clearinghouse, debit, automated teller machine, and/or credit card transaction systems. Arrangements and configurations may be used to transact purchases automatically and/or automated. Purchases may be initiated and/or transacted by or on behalf of one or more consumers and/or entities. Similarly sales may be conducted using a system as in a sales card rather than a purchase card. As such families may apportion budgetary monies towards accounts that are accessible by one or more persons. Business entities may provide a purchase and/or sales card in order to acquire and/or purchase of materials, goods, services, contracts, transactions, and/or exchanges. Consumers and/or entities may joint accounts with access to shared resources. An entity may cause one or more purchase and/or sales actions to occur and/or operate.

The arrangement of accounts, purchases, and/or sales may be done automatically, with triggers, timing, ranges, thresholds, notification, authorization, or any consumer or supplier control. The customer may also, or alternatively, use a programmable purchase card or purchase device that transmits with a reference number a code or selection of an account to use. A purchase card or device may comprise a chip, display, buttons, indicia, touch-screen and/or touch-sensitive areas that make selections at the time of purchase, at other desired times at the point of sale device, and/or by the customer. Similarly, the point of sale device may also be equipped with such features in order to process customer accounts and/or to process coupons and/or incentives of the retailer or seller. These selections at the point of sale device may be supplied at the time of sale in order to adjust prices. The use of a preferred embodiment of the system allows one or more consumers and/or entities to arrange and configure a customizable system/s and/or infrastructure/s to conduct purchases and/or sales according to private means that are undetectable in public networks. Portions of a system may or may not contain private, personal, financial, and/or identity information on a public network, internet, intranet, extranet, and/or cloud.

A preferred embodiment serves financial decisions according to customer information and third-party data. Processing of a transaction may proceed first with the method of authenticating identity as described above. Processing a transaction may proceed without a response for authenticating identity or with a multi-valent response as described above. A third-party defines a procedure for making financial decisions that comprise one or more rules, programs, regulations, computations, formulas, criterions, and/or evaluations needed to respond to a request for and/or inquiry into a financial service such as auction, barter, credit, derivative, exchange, future, hedge, loan, purchase, refinance, increment, stock, bond, trade, grant, distribution, approval, conditional, request, substitution, transfer, liability, debt, collection, and/or sale of a monetary value. A system may be implemented in order to extend, expand, retract, cancel, and/or recall one or more financial services. Any entity that uses financial services may implement the process of rendering financial decisions. A purchase, sales, service, and/or transaction system may be implemented as a substitute to, competitive with, to supplement, advantageously position, to price, and/or perform auxiliary functions with one or more existing financial systems, exchanges, marketplaces, and/or networks. One or more procedures from one or more entities may be implemented to render one or more financial decisions for one or more customers and/or entities.

The entities may be actuarial, banking, government, revenue, insurance, medical, manufacturers, exchanges, marketplaces, consumer goods, and/or service companies or organizations that use or reference a Social Security Number and/or Employer Identification Number. The third-party requests the reference number of a customer and additional identifying features such as address and telephone number as defined above. The identifying information of the customer may be used to authenticate identity of a customer, entity, and/or a third-party. This request may be through a paper form, digital format, graphical interface, website, automated programming interface, audial format, keypad, telephonic format, and/or electronic input. Similarly the entity may define a procedure through one or more request formats for inputting a procedure. The procedure may translated into one or more program, script, interface, language, code, symbol, and encrypted formats. The procedure may be sent with requests or may be requested from another entity, customer, processor, and/or data memory. Procedures may be run in one or more automated form, batch, clearinghouse, register, and/or shell.

A processor retrieves a third-party procedure and a processor retrieves customer information. A processor processes the customer information according to the third-party procedure. The third-party procedure is implemented to apply custom defined logic to the data of the customer. The processor responds to the request for verification for financial attributes to the third-party. Specific financial data and/or identifying data may, or may not, be provided in the response from a processor to a third-party. The customer may or may not be notified of the request. The customer may or may not be prompted to grant permission to access identity and/or financial data. The customer may or may not have set financial data in a data memory record similar to the identifying information as discussed above. The customer may or may not be prompted about a conditional response that may or may not require permission about a decision of a third-party procedure. The customer may or may not receive information about further actions to obtain a financial product from one or more third-parties. The customer may or may not receive advertisements from third-parties. Customer data and response may or may not be forwarded to one or more third-parties such as a financial services entity or marketplace. A customer, third-party, or entity processing the authentication and/or request may receive incentive, compensation, reward, credit, or commission for processing and/or completing a request.

The third-party procedure may be defined by the third-party, on behalf of a third-party, or for a third party. A procedure may be defined by one or more procedures from one or more individuals, entities, organizations, and/or groups. A procedure defines a set of logical conditions comprising one or more rules, definitions, programs, regulations, computations, formulas, criterions, and/or evaluations needed to respond to a request for and/or inquiry into a financial service such as auction, barter, credit, derivative, exchange, future, hedge, loan, purchase, refinance, increment, stock, bond, trade, grant, distribution, approval, conditional, request, substitution, transfer, and/or sale of a monetary value. The procedure may be used to mask a financial service. The procedure may be used to conceal information about a customer and/or third-party from transmission relating to a financial service. A processor completes a procedure that may or may not result in a response. A processor completes a procedure that may or may not result a read, write, or update of data memory. The procedure may require additional steps or sequences, request information, exchange data, or obtain procedures in order to complete a request. The processor or procedure may respond with a multi-valent response. A multi-valent response may accompany an authentication of identity. A multi-valent response may further include one or more indication, condition, request for more information, time-sensitive response, offer, purchase, sale, instruction, recommendation, denial, transcript, title, lien, deed, bill, record, receipt, or statement.

A procedure defines a set of logical conditions that establish a way to evaluate a procedure or request. As genera, the procedure refers to identification and/or financial data, wherein a procedure requests at least one of these types of data in order to respond to a request. One of the purposes of the procedure is to define a procedure for the criterion to authenticate identity. For example, identity in a form may need to be authenticated according to a time, location, probability, and/or likelihood. Identity may also need to be authenticated using financial data such as tax records, credit card transactions, purchases, sales, and other kinds of transactions that indicate the time and location of a person. A procedure that authenticates identity furthermore responds with one or more responses that may or may not be in a multi-valent format. Procedures may be defined in a manner that is generic for computational and/or human methods of authenticating information depending on the level of sensitivity of the person and/or information. An automated system that operates the services may define procedures that third-parties may use. One or more procedures could define governmental regulations for conducting actuary, business, commerce, pricing, exchanges, transactions, transfers, purchases, sales, tax revenue, tariffs, risk, and/or loans. Or third-parties may define procedures that the service uses to provide customized authentication and/or responses. Procedures may be programmed with one or more flowcharts, process diagrams, scripts, programs, executibles, tags, codes, languages, assembly, in-chip, and/or on-chip implements. The procedure may be defined as a software program or in hardware circuits. A procedure may be performed by a processor in one or more local, distributed, remote, cloud, or server computers.

For financial services, the procedure encodes the logic used to determine financial decisions. A procedure automates the process of making financial decisions or decisions that use financial data. A customer application for a loan in one example of the procedure for authentication and response. A loan form routinely includes personal information including name and contact information. The form, however, may include an identifying number or reference for the customer that a procedure uses to authenticate the identity of the customer. Another procedure could operate to obtain the financial information of the customer. A procedure could respond with a query to the customer to supply current income, debt, and address. The procedure could automatically obtain this data from information provided by the customer. Another procedure could obtain the credit score and report on behalf of the customer and store the data in a memory device. Another procedure operates to process the financial information according to the evaluation process of the loan application. Procedures may automate any financial transaction wherein data may or may not be transmitted between a third party and services system. Procedures may be used to record information and/or to respond with business decisions.

EXPLANATION OF FIGURES

The following explanation of figures exemplifies embodiments of further preferred and illustrative devices, interfaces, methods, and systems for secure authentication of identifying data and financial attributes services. The following embodiments are meant for illustrative purposes and not to limit the span or breadth of the envisioned inventions.

FIG. 1. Data Input and Memory Devices. A data input device allows a consumer to input identity information into one or more memory storage devices. Consumer inputs information, 100, through an input device such as a keyboard or keypad. A portion of the data, 110, is stored on a networked cloud, 120, and another portion on a memory device, 140. The memory device may be inaccessible to another electronic device after storing the data. A consumer may update and/or modify information through an interface to the memory device or to a memory record in a remote location for processor procedures.

FIG. 2. Memory Devices and Data Retrieval. Data is accessed from a memory device, 200, with a memory process having connectivity to processors and a cloud, 240. Data from a set of memory devices, 220, is retrieved by a memory processor, 200. The memory devices operate with an accompanying sensor, 210, or supply device that responds to a request from the memory device to supply identifying data. The perforated lines represent accessible or inaccessible connectivity through an electronic signal. The memory processor sends an interrogative signal to the sensor to obtain data from the memory device. The memory processor provides data to one or more processors, 230, to authenticate the data or retrieve identifying data and/or financial attributes. The personal data is available only to the processors and for a certain amount of time. Personal data may not be stored on a processor or accessible to the cloud. The processor responds through a cloud interface to a request.

FIG. 3. Identifying Data and Secure Authentication. A flowchart for secure authentication of identifying data. A request for authentication accompanies personal identifying information, 300. A request processor optionally uses the identifying information to notify a customer of a request for authentication. The dotted lines represent optional sequence or process flow. Notification may be sent through a sms text, email alert, telephonic interface, and/or automated preselected response. The request processor forwards the identifying information to a data processor. The customer responds to the notification of the request for authentication. The data processor obtains identifying number, 310, from the memory device if the customer approves the request. The data processor otherwise forwards the customer response to the authentication processor. The authentication processor authenticates the personal data from the memory device and the identifying data that accompanies the request for authentication, 300, if the customer approves the request. The authentication response, 320, provides the results of the authentication processor according to the identifying information provided in the request and the customer response to authentication notification.

FIG. 4. Financial Services Request, Third-Party. A flowchart for secure authentication of identifying data and response to financial attribute service request. A request for authentication accompanies personal identifying information, 400, and a selection for a procedure to process financial attribute data, 410. A request for financial service may be initiated with a form interface (FIG. 7A). A request processor optionally uses the identifying information to notify a customer of a request for authentication. The dotted lines represent optional sequence or process flow. Notification may be sent through a sms text, email alert, telephonic interface, and/or automated preselected response. The request processor forwards the identifying information to a data processor. The customer responds to the notification of the request for authentication. The data processor obtains identifying data and financial attributes, 420, from the memory device if the customer approves the request. The memory processor obtains the Social Security Number and using the identifying information obtains an identification number from the memory device. The memory processor obtains a financial attribute such as income level. The data processor otherwise forwards the customer response to the authentication processor. The authentication processor authenticates the personal data from the memory device and the identifying data, 400, and financial attributes, 420, if the customer approves the request. The authentication processor forwards the results of the authentication to the procedure processor.

The authentication response, 420, forwards the results and the procedure selection, 410, to the procedure processor. The procedure processor obtains the selected procedure logic, 430. The procedure processor processes the financial attributes, 420, according to the logic of the procedure, 430. Auxiliary processes may be used to obtain additional data or service, either remote or local, through a network or software. Additional data may be a supplemental information required to process the financial service. Additional service may be a request for Credit Report from a Credit Bureau. The procedure processor responds with an authentication response, 440, and a multi-valent response, 450. The multi-valent response comprises an approval and a loan amount. The procedure processor provides the results of the authentication processor according to the identifying information provided in the request, the customer response to authentication notification, the identifying data, and the financial attributes.

FIG. 5. Financial Services Request, Consumer. A flowchart for a financial service request from a consumer at a Point of Sale. A flowchart for requesting a financial service at a POS. A request for authentication accompanies personal identifying information, 500, and a selection for an account from a purchase card to process purchase request, 510 (FIG. 6). The consumer presets the accounts for selection through an input device and data input interface with connectivity to a cloud data record (FIGS. 1, 2). A digital shopping cart, or store register, provides the currency amount to be purchased, 560, such as the amount in USD. A request processor optionally uses the identifying information to notify a customer of a request for authentication. The dotted lines represent optional sequence or process flow. Notification may be sent through a sms text, email alert, telephonic interface, and/or automated preselected response. The request processor forwards the identifying information to a data processor. The customer responds to the notification of the request for authentication. The data processor obtains identifying data and account number, 520, from the memory device if the customer approves the request. The data processor otherwise forwards the customer response to the authentication processor. The memory processor using the account selection obtains a credit card account number from a cloud memory and using the identifying information obtains an identification number from the memory device (FIG. 2). The authentication processor authenticates the consumer data from the memory device and the identifying data, 500, and identification number and account number, 520, if the customer approves the request. The authentication processor forwards the results of the authentication to the procedure processor.

The authentication processor, 520, forwards the results and the account selection, 510, to the procedure processor. The procedure processor obtains the selected procedure logic, 530. The procedure processor processes a financial transaction with the account number, 520, according to the logic of the procedure, 530, and purchase amount, 560 through a credit card network with connectivity through the auxiliary transactions. The procedure processor responds with an authentication response, 540, and a multi-valent response, 550. The multi-valent response comprises a transaction number and timestamp. The procedure processor provides the results of the authentication processor as a multi-valent response according to the identifying information, the identification number, the customer response to authentication notification, the account selection, and the purchase amount.

FIG. 6. Point of Sale Purchase Card. A consumer purchase card, 600, having selectable features, 620. The purchase card may be used at a point of sale device and processes the purchase through a procedure. The purchase card initiates the financial services request and sends identifying information to a request processor (FIG. 5). The consumer may select a financial account from the purchase card, 620. The account selection sets the microchip to provide the account selection and is programmed through the electronic connectivity, 630, from the selectable features, 620, to the microchip, 610. The purchase card is inserted into a Point of Sale system that reads the microchip, 610. The request for financial service of a purchase is transmitted to a request processor. The account is sent with the request along with the identifying information. A purchase transaction using a credit card account is processed through the procedure processor. The request receives a multi-valent response of authentication and completion of purchase transaction.

FIG. 7. Financial Services Sample Form Interface. Financial services application form with and without a SSN. A form for financial services includes identifying information of a consumer. A form requests information with an identifying number that authenticates without a Social Security Number, 700. The Social Security Number is stored in a memory device and retrievable through a memory processor (FIGS. 1, 2, 4). A request for authentication and financial service such as a loan is processed without the consumer providing the Social Security Number on a form interface.

A prior art form interface requires the consumer to provide the Social Security Number in order to process a request for financial service.

Definitions

Identifying Number. A number that refers to, points to, references, calls, symbolizes, signifies, and/or gives an address a person, individual, group, and/or entity. Examples of identifying numbers include Social Security Number, Employer Identity Number, driver's license, a customer number, a medical ID number, a serial number, a bar-code, and/or an anonymity identifier.

Address. An address refers to one or more mailing address, telephonic telephone number, IP address, domain name, account, number, user login, email address, and/or any way of refer to a location or presence of a person, individual, group, and/or entity. An address may be static, dynamic, referential, sequential, or combinations thereof.

An anonymity identifier. An identifier that may be used when assigning a number when referring to a person, individual, group, and/or entity for the purposes of statistical, medical, informational, governmental, or organizational purposes.

A number may be an alphanumeric, cardinal, ordinal, decimal, quantum state, and/or fractional number, and combinations thereof.

A third-party may retain anonymity, remain anonymous, or be publicly known. An anonymous third-party could be, i.e., a bank advertising credit card offers to customers. A known third-party could be an insurance company processing an application form of a customer in order to obtain health msurance.

A financial service. An auction, barter, credit, derivative, exchange, future, hedge, loan, purchase, refinance, increment, stock, bond, trade, grant, distribution, approval, conditional, request, substitution, transfer, and/or sale or a monetary value. Any manner, procedure, means, instrument, or process involving any action of, for, by and/or on behalf of a monetary value. Monetary value may be a currency, credit, metal, note, and/or any form of referring to something of value.

A multi-valent response. Data that signifies one or more modes of information, such as a decision and a confirmation number. Modes of information include gradients, scales, litmus, advisory, alert, caution, signs, symbols, signals, colors, wavelengths, frequencies, and any manner of encoding information. One or more types or forms of data may accompany, associate, follow, precede, refer to, sequence, and/or transmit with one or more modes of communication within any duration or span of time.

POS. Point of Sale Device.

Applicant claims the following:

1. A system for a consumer to make a purchase at a register, comprising a store register, wherein the register comprises a digital cart, payment server, and point of sale device;
a financial transaction server;
a secure authentication server;
a payment server;
wherein the financial transaction server receives a payment request, sent from a payment server from a first consumer to record a credit of money for a future second consumer, wherein the future second consumer is anonymous to the first consumer;
the first consumer uses the payment server to credit an amount of money to a financial account using a data record that comprises an account number for the future second consumer and further receives electronic data that represents personal identifying information for an anonymous future second consumer, wherein the personal identifying information comprises one or more of a credit score, taxable income, biographical details, biometrics, medical condition, or zip code;
the transaction server stores the credit in a financial account in an electronic clearinghouse using an electronic data record that contains an electronic address that refers to personal identifying information of a future consumer;
wherein, after a duration of time, at a register,
the secure authentication server receives an electronic request, sent by a register from consumer purchase device that a second consumer requests to purchase a good or service, the consumer having personal identifying information and the good or service having a first price;
the electronic requests comprise electronic data comprising personal identifying information of the consumer using a data record, wherein the personal identifying information further comprises a digital number or description of a credit score, taxable income, medical condition, biographical details, biometrics, zip code, or combinations thereof;
the consumer purchase device provides the electronic data in the form of a digital address that is encrypted by the device and sent to the authentication server by the register in encrypted form;
the authentication server authenticates the identity of the consumer by sending an electronic notification to an identity check processor to authenticate the consumer and receives an electronic signal that either confirms or does not confirm that consumer identity and the authentication validates the encrypted digital address by confirming it matches a digital address of the customer that is stored in memory data;
the authentication server sends an electronic request for electronic money to the financial transaction server comprising electronic data that represents personal identifying information in the form of an electronic address based on a confirmed identity and address of the consumer that requested to purchase a good or service at a register;
the financial transaction server receives the request for electronic money in the form of an encrypted electronic address and the transaction server authenticates the electronic address,
the transaction server evaluates the address using a clearinghouse processor that locates financial accounts that have an address that matches the address sent from the authentication server, and receives an electronic notification from the clearinghouse processor for a matching account address that is available for the consumer based on the electronic address;
the transaction server, using the electronic notification, locates the financial account, debits money from the account, and generates an electronic notification that is sent to the register, wherein the electronic notification comprises the amount of the money and an electronic reference number for the money;
the register receives the electronic notification and determines a second price for a good based on the money in the account by calculating the difference between the price of the good and the money available to the second consumer from the first consumer;

the register initiates a payment request from the second consumer using a point of sale device for the calculated price;

the second consumer completes a payment process using the point of sale device for the good based on the second price and debits electronic money from a payment device for the amount of the second price; and the register initiates a collection request for the money based on the reference number from the transaction server; and the store register receives electronic money from the transaction server and from the point of sale device in an amount that is determined as the first price of the good.

2. The system of claim 1, wherein the authentication server has previously confirmed the identity of the first consumer by using an electronic device and requesting validation of identifying information from an identity verification server using an application programming interface with an electronic data record that comprises a driver's license number, fingerprint, or government identifier, the authentication server transmits, via a network interface, a request from a smartphone or electronic device that comprises a code to authorize authentication, and the first consumer transmits, via the network interface, a response using a digital interface on the electronic device to the authentication server to confirm the personal identity.

3. The system of claim 2, wherein the first consumer comprises a plurality of consumers that each use a payment server to credit money to a financial account for a second consumer and the server further receives electronic data that represents personal identifying information for an anonymous second consumer, wherein the personal identifying information comprises one or more of a credit score, taxable income, biographical details, biometrics, medical condition, or zip code; and the transaction server stores a plurality of credits in a matching plurality of financial accounts with an electronic clearinghouse using an electronic data record that contains an electronic address that refers to personal identifying information of a second consumer.

4. The system of claim 2, wherein the authentication server has previously confirmed the identity of the future second consumer by using an electronic device and requesting validation of identifying information from an identity verification server or an application programming interface with a electronic data record that comprises a driver's license number from a government agency, the authentication server transmits, via a network interface, a request to a smartphone or electronic device that comprises a code to authorize authentication, and the future second consumer transmits, via a network interface, a response using a digital interface on an electronic device to the authentication server to confirm the personal identity.

5. The system of claim 4, wherein the authentication server transmits a digital request to the future second consumer on an electronic device with a digital form that requests personal identifying data of the consumer comprising one or more of a credit score, taxable income, biographical details, biometrics, medical condition, or zip code, the server further transmits a digital request to a government or credit agency to authenticate the personal identifying data of the second consumer, the server evaluates each of the authenticated data and generates a reference number for each of the personal identifying data of the consumer that is an anonymity identifying number and an identification number for the consumer, the server generates at least one electronic address by storing at least one reference number and identification number in the memory of a digital clearinghouse processor, wherein the electronic address comprises a sequence of reference numbers.

6. The system of claim 5, wherein the transaction server transmits, via a network interface, a request to the clearinghouse processor that comprises at least one electronic address, the clearinghouse processor retrieves a data record using the electronic address, wherein the data record in the clearinghouse has an electronic address that matches the electronic address transmitted by the server, wherein the data record comprises a financial account number that contains within it electronic money, and the processor transmits the account number to the transaction server.

7. The system of claim 1, wherein the first consumer uses the payment server to credit money to a financial account using a data record that comprises an identification number for a good or service, wherein the number is a bar-code or alphanumeric number and optionally the first price of the good is determined at a register by calculating a new price based on the value of a coupon.

8. The system of claim 1, wherein the digital cart comprises goods for purchase and for each good in the digital cart, the authentication server sends an electronic request for electronic money to the financial transaction server comprising electronic data that comprises an identification number for the good or service;

the financial transaction server receives the request for electronic money in the form of the electronic address for the second consumer and the identification number for the good, the transaction server evaluates the address and number using a clearinghouse processor that locates financial accounts that have an address that matches the address and a number that matches the identification number sent from the authentication server, and receives an electronic notification from the clearinghouse processor for a matching account address that is available for the consumer based on the electronic address;

the transaction server using the electronic notification locates the financial account, debits money from the account, and generates an electronic notification that is sent to the register, wherein the electronic notification comprises the amount of the money and an electronic reference number for the money;

the register receives the electronic notification and determines a second price for each of the goods based on the money from the accounts by calculating the difference between the price of the good and the money available to the second consumer for the good.

9. The system of claim 1, wherein the first consumer is an entity selected from a banking, credit, government, insurance, medical, manufacturer, exchange, marketplace, consumer goods, service companies, or agencies.

10. The system of claim 1, wherein the payment server further uses a crypto processor to process a payment and wherein the digital money comprises a digital token payment or digital currency payment.

11. A method for making a purchase at a store register, wherein the method uses a store register, financial transaction server, secure authentication server, and payment server, wherein the register comprises a digital cart, payment server, and point of sale device;

a first customer initiates a payment by transmitting a digital signal to a financial transaction server using a payment device that requests to record a credit of money for a future second customer, wherein the future second customer is anonymous to the first customer, the payment server responds by generating a digital interface with which the customer uses to select personal identifying information for an anonymous future second consumer, wherein the personal identifying information comprises one or more of a credit score, taxable income, biographical details, biometrics, medical condition, or zip code and select an amount of money to credit to for a future second customer;

after the processor completes the payment request by collecting digital money from the first customer using a digital payment device, the transaction server transmits a data record to an electronic clearinghouse for storing in data memory, wherein the record comprises the digital address and amount of the credit of the digital money;

the electronic clearinghouse stores the digital address and amount in a retrievable memory processor such that the clearinghouse can retrieve a reference number to the digital money using the digital address, wherein the address refers to personal identifying information of an anonymous future customer;

wherein, after a duration of time, at a register, the second customer using a cart adds goods for purchase to a shopping cart;

the second customer initiates a digital request to a register to purchase the goods, wherein the second customer has personal identifying information and optionally a purchase device;

the register initiates a digital request to a secure authentication server to request electronic money for making the purchase of the goods for the second customer, wherein the first and second customers are anonymous to each other;

the register or payment device transmits a electronic data record comprising personal identifying information of the second customer and the good having a first price, wherein the personal identifying information further comprises a digital number or description of a credit score, taxable income, medical condition, biographical details, biometrics, zip code, or combinations thereof;

the consumer purchase device provides the electronic data in the form of a digital format that is encrypted by the device and sent to the authentication server by the register in encrypted form, wherein the digital format is a digital address;

the authentication server sends an electronic data record to an identity check processor to authenticate the consumer using a portion of the personal identifying information and receives an electronic signal that either confirms or does not confirm that consumer identity and validates the encrypted digital address by confirming it by comparing the digital address with digital addresses accessible to the server that are stored in memory data of the server;

the authentication server sends an electronic request for electronic money to the financial transaction server, wherein the request comprises an electronic data record that represents personal identifying information in the form of an electronic address based on a confirmed identity and address of the consumer and an identification number for the good for purchase;

the transaction server evaluates the address using an electronic clearinghouse processor that locates financial accounts that have an address that matches the address sent from the authentication server and the server receives an electronic notification from the clearinghouse processor that a matching account address is available for the second consumer based on the electronic address;

the transaction server, using the electronic notification, requests the electronic money from the clearinghouse, which retrieves access to the financial account, debits electronic money from the account, and generates an electronic notification that is sent to the register, wherein the electronic notification comprises the amount of the money and an electronic reference number for the money;

the transaction server sends a data record to the register comprising the amount of money and electronic reference to the money;

the clearinghouse processor debits the account for the digital money and stores the digital funds in a retrievable digital memory;

the register receives the electronic notification and determines a second price for a good based on the money retrieved for the second customer by calculating the difference between the price of the good and the money available to the second consumer from the first consumer;

the register initiates a payment request from the second consumer using a point of sale device for the calculated second price;

the second consumer generates a digital payment for the good in an amount of second price and completes a payment using a payment device or point of sale device for the good based on the second price, wherein the payment for an amount of the second device is debited from a payment account of the second customer; and the register initiates a digital request to the transaction server to collect the digital money from the transaction server and a digital request to the payment device or point of sale device for digital money from the second customer; and the store register receives electronic money from the transaction server and from the payment device or point of sale device, records purchase of the good in digital memory of the register, and stores in the digital memory reference numbers for the payments collected from the transaction server and second customer payment in an amount that is determined as the first price of the good.

12. The method of claim 11, wherein the authentication server processes confirmation of the identity of the first consumer before the customer makes initiates a first payment to an anonymous future second customer by requesting authentication at a digital interface using an interface in digital form on an electronic device from an identity verification server using an application programming interface and an electronic data record that comprises a driver's license number, fingerprint, or government identifier, the authentication server transmits, via a network interface, a request that comprises a code to authorize authentication, and the first consumer transmits, via the network interface, a response using a digital interface on the electronic device to the authentication server to confirm the personal identity.

13. The method of claim 12, wherein the first consumer comprises a plurality of consumers that each initiate payment separately at a payment server to credit money to a financial account the second consumer and the server further receives electronic data that represents personal identifying information for an anonymous second consumer, wherein
- the personal identifying information comprises one or more of a credit score, taxable income, biographical details, biometrics, medical condition, or zip code; and
- the transaction server stores a plurality of credits in a matching plurality of financial accounts with an electronic clearinghouse using an electronic data record that contains an electronic address that refers to personal identifying information of a second consumer.

14. The method of claim 12, wherein the authentication server confirms the identity of the future second consumer prior to initiating a request to purchase a good by using an electronic device and requesting validation of identifying information from an identity verification server or an application programming interface with a electronic data record that comprises a driver's license number from a government agency,
- the authentication server transmits, via a network interface, a request to a smartphone or electronic device that comprises a code to authorize authentication, and the future second consumer transmits, via a network interface, a response using a digital interface on an electronic device to the authentication server to confirm the personal identity.

15. The method of claim 14, wherein the authentication server transmits a digital request to the future second consumer on an electronic device with a digital form that requests personal identifying data of the consumer comprising one or more of a credit score, taxable income, biographical details, biometrics, medical condition, or zip code,
- the server further transmits a digital request to a government or credit agency to authenticate the personal identifying data of the second consumer,
- the server evaluates each of the authenticated data and generates a reference number for each of the personal identifying data of the consumer that is an anonymity identifying number and an identification number for the consumer,
- the server generates at least one electronic address by storing at least one reference number and identification number in the memory of a digital clearinghouse processor, wherein the electronic address comprises a sequence of reference numbers.

16. The method of claim 15, wherein the transaction server transmits, via a network interface, a request to the clearinghouse processor that comprises at least one electronic address, the clearinghouse processor retrieves a data record using the electronic address, wherein the data record in the clearinghouse has an electronic address that matches the electronic address transmitted by the server, wherein the data record comprises a financial account number that contains within it electronic money, and wherein the processor transmits the account number to the transaction server.

17. The method of claim 11, wherein the first consumer uses the payment server to credit money to a financial account using a data record, wherein the data record comprises an identification number for a good or service, wherein the number is a bar-code or alphanumeric number, and wherein optionally the first price of the good is determined at a register by calculating a new price based on the value of a coupon.

18. The method of claim 11, wherein the digital cart comprises goods for purchase and for each good in the digital cart, the authentication server sends an electronic request for electronic money to the financial transaction server comprising electronic data that comprises an identification number for the good or service;
- the financial transaction server receives the request for electronic money in the form of the electronic address for the second consumer and the identification number for the good,
- the transaction server evaluates the address and number using a clearinghouse processor that locates financial accounts that have an address that matches the address and a number that matches the identification number sent from the authentication server, and receives an electronic notification from the clearinghouse processor for a matching account address that is available for the consumer based on the electronic address;
- the transaction server using the electronic notification locates the financial account, debits money from the account, and generates an electronic notification that is sent to the register, wherein the electronic notification comprises the amount of the money and an electronic reference number for the money;
- the register receives the electronic notification and determines a second price for each of the goods based on the money from the accounts by calculating the difference between the price of the good and the money available to the second consumer for the good.

19. The method of claim 11, wherein the first consumer is an entity selected from a banking, credit, government, insurance, medical, manufacturer, exchange, marketplace, consumer goods, service companies, or agencies.

20. The method of claim 11, wherein the payment server further uses a crypto processor to process a payment and wherein the digital money comprises a digital token payment or digital currency payment.

* * * * *